US008626802B2

(12) United States Patent  
Jalon et al.

(10) Patent No.: US 8,626,802 B2  
(45) Date of Patent: Jan. 7, 2014

(54) DYNAMIC MEDIA CONTENT PREVIEWS

(75) Inventors: Julien Jalon, Paris (FR); Pierre d'Herbemont, Paris (FR); Jean-Pierre Ciudad, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 348 days.

(21) Appl. No.: 12/509,401

(22) Filed: Jul. 24, 2009

(65) Prior Publication Data

US 2011/0022643 A1 Jan. 27, 2011

(51) Int. Cl.  
*G06F 17/30* (2006.01)

(52) U.S. Cl.  
USPC ............................. 707/805; 707/913; 715/274

(58) Field of Classification Search  
USPC ................... 707/805, 916, 999.102, E17.014, 707/913–914; 715/250, 700, 704, 716, 719, 715/727, 240–241, 248–249, 201–203, 715/273–274  
See application file for complete search history.

(56) References Cited

U.S. PATENT DOCUMENTS

| 5,974,549 | A | 10/1999 | Golan | |
|---|---|---|---|---|
| 6,763,377 | B1 * | 7/2004 | Belknap et al. | 709/223 |
| 2003/0023641 | A1 * | 1/2003 | Gorman et al. | 707/530 |
| 2003/0052909 | A1 * | 3/2003 | Mo et al. | 345/716 |
| 2003/0149801 | A1 * | 8/2003 | Kushnirskiy | 709/328 |
| 2008/0163155 | A1 * | 7/2008 | Gowen et al. | 717/100 |
| 2008/0304573 | A1 * | 12/2008 | Moss et al. | 375/240.28 |
| 2009/0039546 | A1 * | 2/2009 | Honma | 264/241 |
| 2010/0082926 | A1 * | 4/2010 | Sahita et al. | 711/163 |
| 2010/0106849 | A1 * | 4/2010 | Chou et al. | 709/231 |
| 2010/0131979 | A1 * | 5/2010 | Sievert et al. | 725/37 |
| 2010/0235528 | A1 * | 9/2010 | Bocharov et al. | 709/231 |

FOREIGN PATENT DOCUMENTS

WO  WO 2005/121920 A2  12/2005

OTHER PUBLICATIONS

PCT Notification of Transmittal of the International Search Report and the Written Opinion of the International Searching Authority, or the Declaration for PCT Application No. PCT/US2010/042606, 13 pgs., (Oct. 5, 2010).  
Apple Inc., "Quick Look Programming Guide—Data Management: File Management", XP007915043, 50 pgs., (Jul. 20, 2009).  
International Preliminary Report on Patentability, mailed Feb. 2, 2012, for International Application No. PCT/US2010/042606, 9 pages.

* cited by examiner

*Primary Examiner* — Greta Robinson  
(74) *Attorney, Agent, or Firm* — Park, Vaughan, Fleming & Dowler LLP

(57) ABSTRACT

A sandboxed process is initiated in response to a request for a preview of dynamic media content. A stream of frames is generated in a preview specific format by a plug-in that executes within the sandboxed process. The stream of frames is provided as the preview of the dynamic media content, where the preview is viewable on a display screen.

16 Claims, 4 Drawing Sheets

DYNAMIC MEDIA CONTENT PREVIEWS

FIELD

Embodiments of the invention relate to streaming media and, more particularly, to providing secure previews of streaming media and digital media content.

BACKGROUND

As computer users become increasingly sophisticated, there is an increasing desire for efficiency in the computer programs that people use. For example, many computer systems have some type of file management system that manages hundreds, or even thousands, of files, to which a user may need access. In many traditional file management systems, it is difficult to ascertain the contents of a particular file without actually opening the file, using the necessary application associated with the file type for the file. Oftentimes, the only useful information that the user can obtain about a file before opening it is the file name. Many users would like to be able to preview the contents of a file before actually committing resources to opening the full application and then the file. Some file management systems, such as the Finder in Mac OS X, offered by Apple Inc. of Cupertino, Calif., provides functionality for previewing files before opening them. Other operating systems and file management systems may also offer some static previewing functionality.

For example, using Apple's Finder, a user can preview documents, such a PDFs, text files, word processing documents, and spreadsheets, etc. Finder also allows a user to preview certain video content that has a native file type recognized by the Mac OS.

The Quick Look daemon in the Mac OS incorporates a variety of plug-ins, each of which accepts a particular data type from a client process and converts it into a preview in one of a set of standard format, such as PDF and HTML. The standard format previews are then displayed by the client process using the Quick Look framework. The advantage of this structure is that it avoids a client application crash being caused by a third party plug-in crashing. However, this model does not work particularly well for dynamic media, such as streaming media, because converting dynamic media associated with a non-native file type into a suitable standard format, takes too much processing time to be useful or reliable.

SUMMARY OF THE DESCRIPTION

When a client process receives a request for a preview of dynamic media content, the request is passed to a sandboxed process. The sandboxed process is isolated from the client process, meaning that if the sandboxed process crashes, the client process remains functional and operational. Within the sandboxed process, the type of dynamic media content is determined. The content type may be determined based on, for example, a uniform-type identifier (UTI). Once the content type has been determined, the sandboxed process retrieves a streaming plug-in to convert the dynamic media content to a media type that the client process can use to display a preview of the dynamic media.

The plug-in is used to convert the dynamic media content according to the protocol associated with the plug-in. In some embodiments, the plug-in generates both an audio component and a video component (at least for the dynamic media content that has both audio and video). As each frame of dynamic content is generated, it is passed to the client process for display as a streaming preview. In some embodiments, the plug-in provides one or more controls to the client process that allows a user to control limited aspects of the preview of the dynamic media content (e.g., "stop," "play," and "pause," etc).

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

As provided herein, various methods, apparatuses and systems enable previews of dynamic media content. When a user selects a file (e.g., from a file management system) and requests a preview of that file, embodiments described herein facilitate conversion of the dynamic media into a format that is suitable for previewing the dynamic media content.

Figure 1:
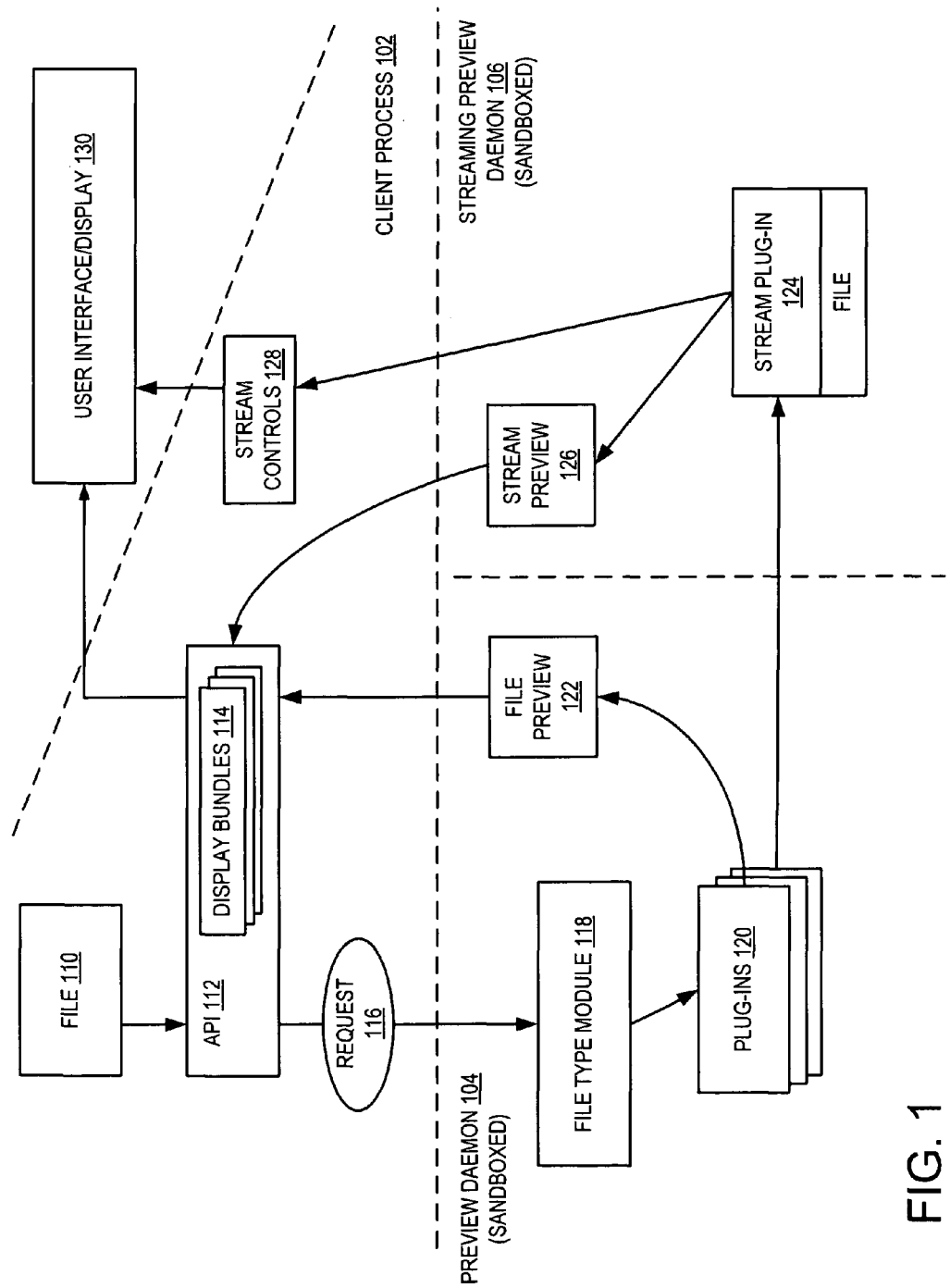
FIG. 1 is a block diagram illustrating a system according to various embodiments.

FIG. 1 is a block diagram, according to various embodiments. As shown, a file management system (e.g., Finder, Windows Explorer, etc.), or other program (e.g., client application, Web browser, etc.), includes a client process 102. Client process 102 is where the user-level interaction takes place with the particular program. When a user requests a preview of file 110, an application programming interface (API) 112 sends a request 116 to preview daemon 104. If preview daemon 104 is not already running, then it is initiated. In various embodiments, preview daemon 104 is a sandboxed process. A sandboxed process is one that is separate from other running processes, or programs. The sandboxed process, or simply sandbox, typically provides a tightly controlled set of resources for guest programs to run in, such as scratch space on disk and memory. In various embodiments, network access, the ability to inspect the host system, or read from input devices, are usually disallowed, or heavily restricted, in the sandbox.

By sending request 116 to preview daemon 104, any manipulation, or conversion, of file 110 that causes any errors/problems with preview daemon 104 (e.g., crashing, hanging, unacceptable latency, etc.), will not affect client process 102. In other words, if preview daemon 104 crashes, client process 102 will continue to run unaffected. For the user, this means that any errors in generating a preview of a file will not prevent the user from using the underlying program, such as the file management system. This can be particularly important if client process 102 is associated with a fundamental user program such as a file management system (e.g., Apple Finder, Windows Explorer, etc.). In some embodiments, if the sandboxed process crashes, the client process may display an indication that the requested preview is not current available.

In various embodiments, a file type module 118 initially receives request 116 from client process 102. File type module 118 determines the file type associated with file 110. As discussed previously, the file type may be determined using a uniform-type identifier, or UTI, which is a string defined by Apple Inc. that uniquely identifies the type of a class of items. Thus, UTIs are used to identify the type of files and folders, clipboard data, bundles, aliases, symlinks, and streaming data. If file type module 118 recognizes the file type of file 110 as a native file type, then file type module 118 retrieves a known plug-in 120 associated with the native file type. For files that contain static media, such as word processing documents, PDFs, HTML files, etc., the retrieved plug-in can handle the file request and convert it into a file preview 122 that is sent back to client process 102 for display as a preview. In certain embodiments, plug-in 120 is directly capable of converting dynamic media content (audio/video files, interactive 3D animation files, etc.), as described in more detail below. The file preview 122 that is sent to client process 102 is handled by API 112, which includes various display bundles 114. Each display bundle includes the resources necessary to display a preview of one or more specific file types. Thus, if file preview 122 is a preview of a PDF, then a PDF display bundle from the group of display bundles 114 takes the PDF preview and prepares it for display on display 130.

Further embodiments described herein are capable of providing previews for dynamic media content (e.g., streaming media, video, 3-D animation, etc.). For example, if file 110 includes dynamic media content, request 116 might be sent to preview daemon 104 and file type module 118 determines the file type, based on, for example, the UTI associated with the file 110. Other identifiers could be used in different embodiments. If the dynamic media is of a native file type and recognized by the file type module 118, then a corresponding plug-in 120 is retrieved to convert the file 110 and provide a preview. If, however, file 110 includes dynamic media content of a non-native file type, then file type module 118 retrieves a designated plug-in 120 to handle the non-native conversion of file 110.

In certain embodiments, the designated plug-in 120 is responsible for retrieving an additional plug-in (stream plug-in 124) to handle the dynamic media content. The designated plug-in may also retrieve a copy of the file that needs to be converted. In some embodiments, this file is the same file that is received as a part of request 116. However, in other embodiments, the file may be a different copy of the same file to be used in converting to a streaming preview.

In addition, another sandbox process 106 is opened, or initiated, for the stream plug-in 124 to convert file 110 into a streaming preview 126. In this way, streaming preview daemon 106 is isolated from preview daemon 104 and from client process 102. Thus, if during the conversion of the file to streaming preview the stream plug-in 124 crashes, process 106, preview daemon 104 and client process 102 remain unaffected. In this way, a user does not lose any functionality in the client application (e.g., the file management system) and, moreover, the user can still preview other files, specifically those that do not require streaming previews without any interruption.

In various embodiments, stream preview 126 is a series of frames converted from the original file 110. The frames associated with stream preview 126 may include limited user functionality. In other words, if a full application (e.g., a media player) were opened to display the dynamic media content in file 110, the user would have the application's full range of user-interfaced options to control and/or manipulate the file. For example, if a user wanted to view a video file and opened a video file viewing application (e.g., Quicktime offered by Apple Inc., Windows Media Player offered by Microsoft Corporation, etc.), the user would have the ability to stop, pause, play, adjust the volume, re-size the window, and/or perform various other operations on the file (e.g., save, delete, copy, etc.) from within the context of the opened application. In contrast, streaming preview 126 offers limited control to the user, as it is specifically designed to be a preview. For example, streaming preview 126 may only provide control over stopping and playing the content in the preview.

Streaming preview 126 is received and handled by API 112 and, more particularly, by one of the designated display bundles 114. In the case of streaming previews, one or more display bundles 114 includes the resources necessary to display streaming preview 126. Thus, a streaming preview display bundle from the group of display bundles 114 takes streaming preview 126 and prepares it for display on display 130.

In addition to generating stream preview 126, stream plug-in 124 may also generate and provide a set of one or more stream controls 128 to client process 102. Stream controls 128 include one or more commands that allow a user to control various aspects of streaming preview 126. Thus, as discussed previously, stream controls 128 might include commands to stop, pause, and/or play the content in the streaming preview. More commands or fewer commands may be included in certain embodiments. In some embodiments, stream controls 128 may not provide the user with the full range of functionality available in the native application associated with the file.

Figure 2:
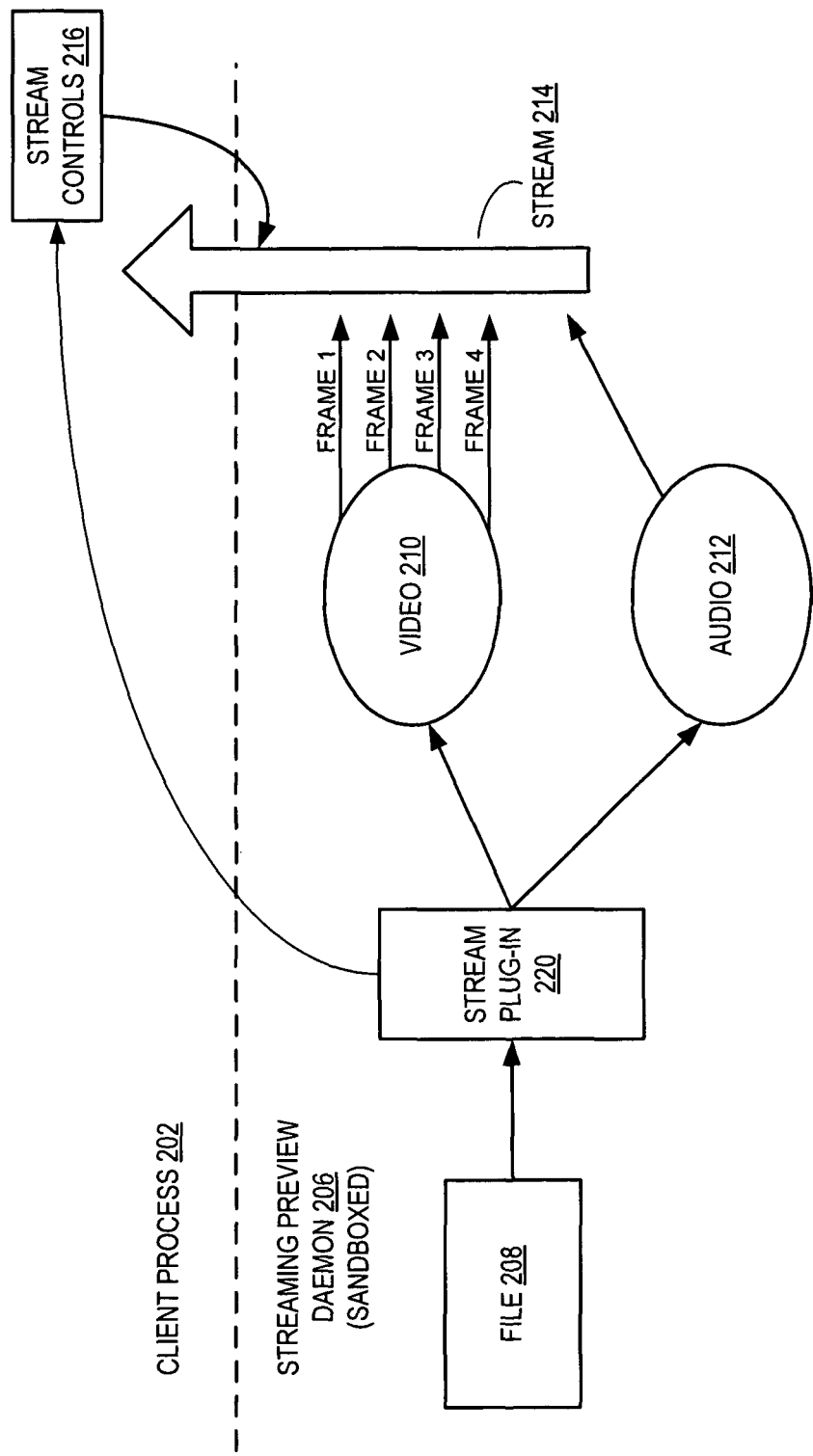
FIG. 2 is a block diagram illustrating a system according to various embodiments.

FIG. 2 is a block diagram illustrating various embodiments associated with generating a streaming preview of dynamic media content. Similar to FIG. 1, FIG. 2 shows a client process 202 and a streaming preview daemon 206. A stream plug-in 220 is used to convert file 208 into the streaming preview. The stream plug-in 220 runs within the sandboxed streaming preview daemon 206. The stream plug-in 220 generates the streaming preview on a frame-by-frame basis and, in certain embodiments, separately generates a video component and an audio component. Thus, file 208 is converted into an audio component 212 and a video component 210. The audio component 212 is added to the stream preview (or, simply, stream) 214 and the video component 210 is added to the stream on a frame-by-frame basis as each frame is generated. So, for example, as soon as frame 1 is converted and generated into a preview-specific format, it is added to the stream and sent to client process 202, without waiting for frame 2 to be converted and generated. Likewise, frame 2 may be immediately added to stream 214 as soon as it is converted and generated. This process continues for each frame that is converted and generated.

As discussed previously, stream plug-in 220 provides stream controls, in various embodiments, to the client process. As shown in FIG. 2, stream controls 216 run within client process 202, and allow a user to control certain aspects of stream 214. As described herein, stream controls 216 provide limited control over the stream 214 and do not provide the full range of control that would be available if the file 208 were opened in a native application.

Figure 3:
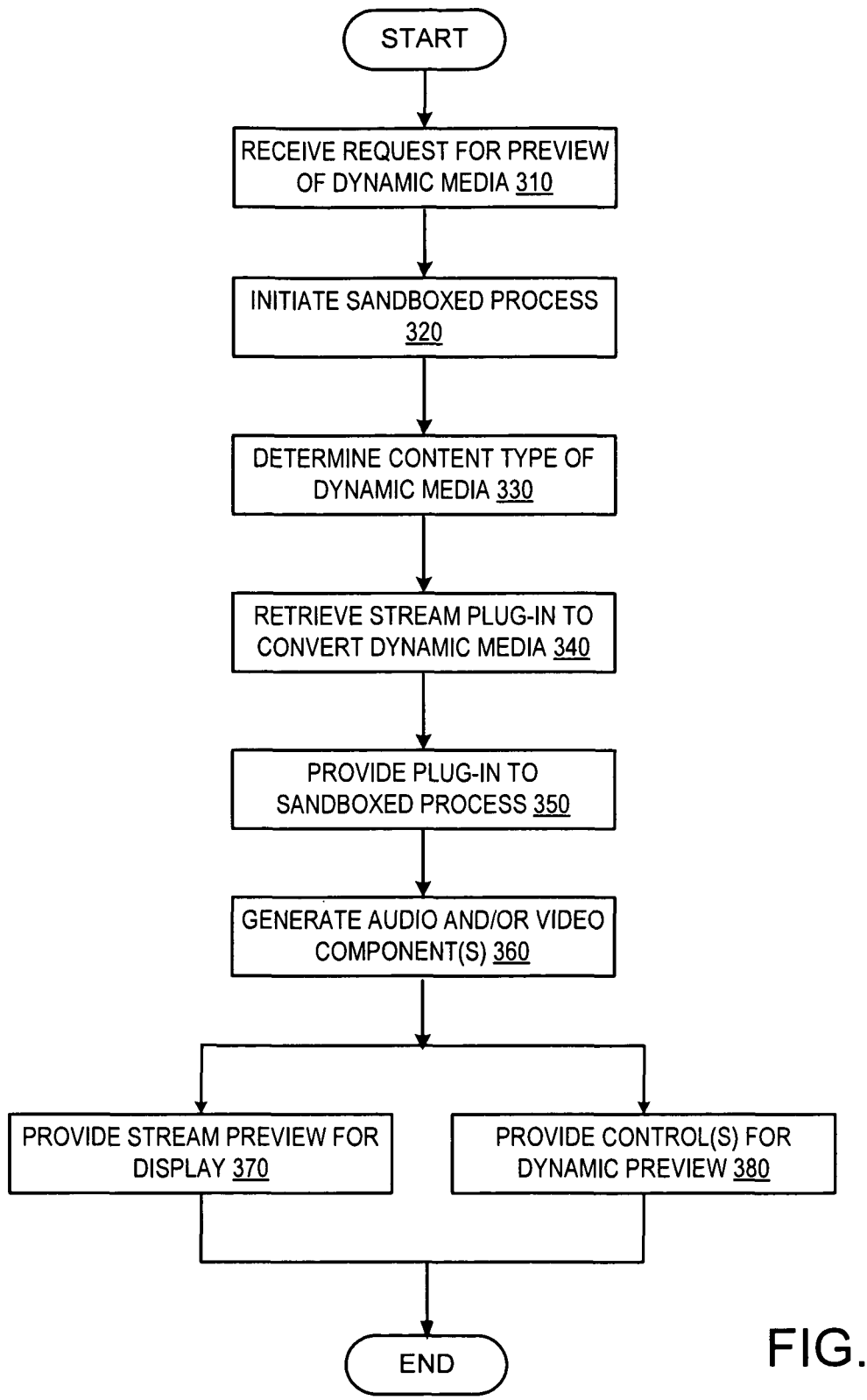
FIG. 3 is a flow diagram of operation in a system according to various embodiments.

FIG. 3 is a flow diagram illustrating various embodiments for providing previews of dynamic media content. A request for a preview of dynamic media is received 310. In response, at least one sandboxed process is initiated 320. A single sandboxed process may already be running, in which case a second sandboxed process might be initiated to separate the streaming media preview from other previews being generated. The content type of the dynamic media is determined 330. The content type may be determined based on a uniform-type identifier (UTI), or other form of file type identification.

Based on the content type, a stream plug-in is retrieved 340 to convert the dynamic media into a preview-specific format. As used herein, a "stream" plug-in refers to any plug-in specifically designated to convert dynamic media content (e.g., video, audio, interactive 3D animation, etc.) into streaming media. If the content type of the dynamic media is a native file type, or, in other words, a recognized file type, then it may be possible to quickly and conveniently convert that file into a preview. However, if the file type is determined to be a non-native file type, then the stream plug-in needs to be capable of converting the original file from one format to a preview-specific format that is compatible with dynamic previewing.

The retrieved plug-in is provided 350 to the sandboxed process and the preview is generated 360. In situations where the file is a video file containing both audio and video data, the plug-in may generate separate audio and video components for the preview. If the original file contains only audio, then only an audio component might be generated. If the original file contains only video without audio, then only a video component might be generated. The streaming media plug-in can also support various files that contain interactive 3D animation, such as COLLADA files. Once the preview components have been generated the stream preview is provided 370 for display to a user and controls for the dynamic preview are also provided 380. Such controls allow a user to control limited functionality associated with the dynamic preview (for example, "stop," "play," "pause"). For 3-D animated files, the dynamic preview may include similar controls, such as the ability to stop, pause, or play the animated file. However, in certain embodiments, the provided user controls are limited, as compared to the controls available when a native application is opened to play the dynamic media content.

It should be noted that in alternate embodiments the steps described in FIG. 3 can be rearranged and performed in a different order that the one shown. Also, it should be noted that more process steps, or fewer process steps, than those described in FIG. 3, can be used to accomplish the same dynamic media preview functionality contemplated by the various embodiments described herein.

Figure 4:
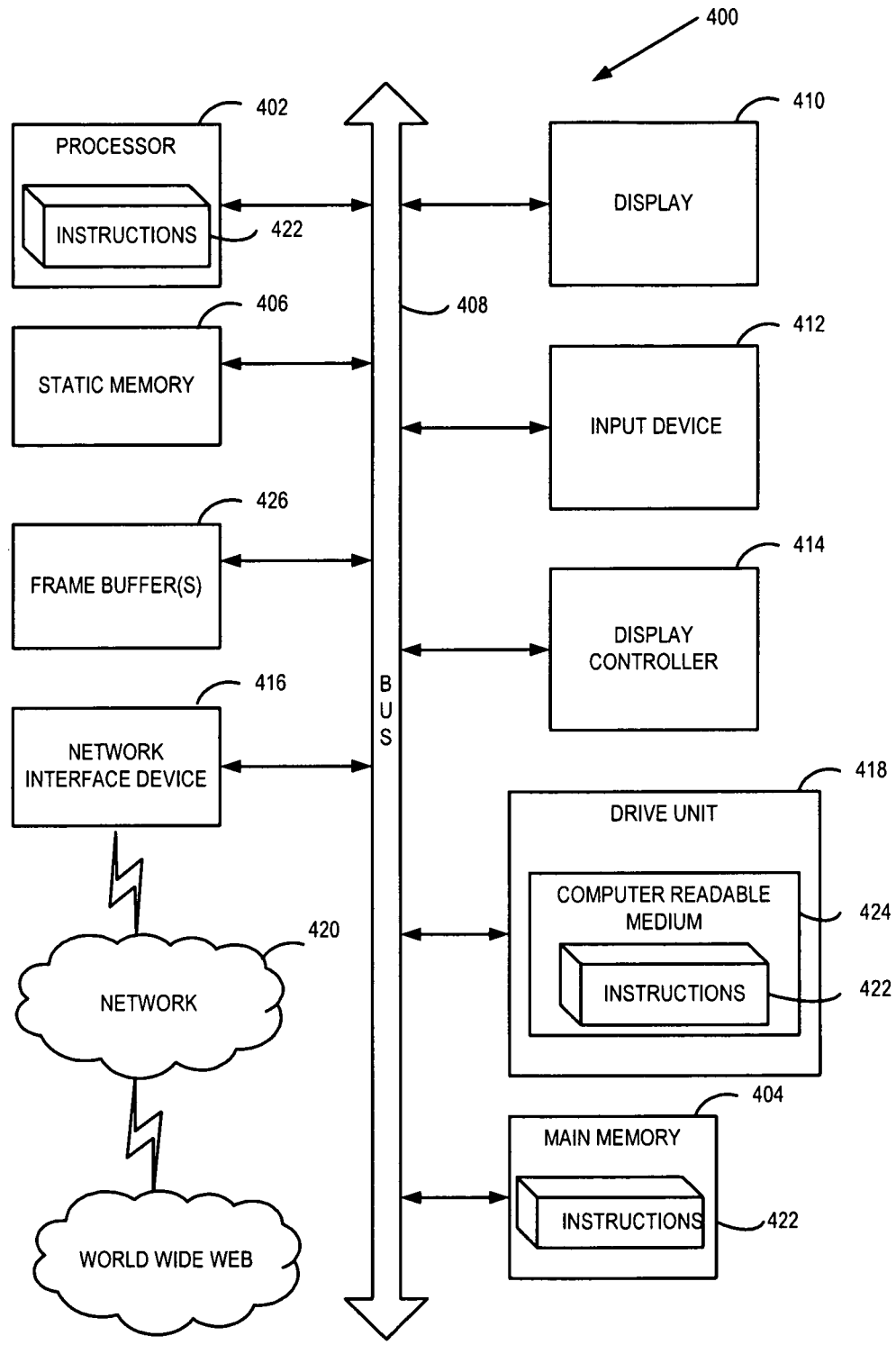
FIG. 4 is a block diagram illustrating a system according to various embodiments.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

According to various embodiments, FIG. 4 also represents a form of the system that can be used to implement the described details shown in FIGS. 1-3. In particular, it should be noted that display 410 can be used to display dynamic media content as does display 130 of FIG. 1. Embodiments that facilitate dynamic media content previews as described herein may included as instructions 422 (in the system of FIG. 4) that are stored, for example, in drive unit 418 or main memory 404 and can be executed by processor 402.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 422 for performing the operations and steps discussed herein.

The computer system 400 may further include a network interface device 416. The computer system 400 also may include a display unit 410 (e.g., a liquid crystal display (LCD), light emitting diode (LED) display, a cathode ray tube (CRT)), and an input device 412 (e.g., a keyboard and/or mouse, etc.).

The secondary memory 418 may include a machine-readable storage medium (or more specifically a computer-readable storage medium) 424 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 416. In various embodiments, web content requested by a user can be retrieved (e.g., from the World Wide Web) via network 420 using network interface device 416.

While the machine-readable storage medium 424 is shown in an exemplary embodiment to be a single medium, the terms "machine-readable storage medium" or "computer-readable storage medium" should be taken to include a single medium or multiple media (e.g., a centralized or distributed database, and/or associated caches and servers) that store the one or more sets of instructions. The terms "machine-readable storage medium" or "computer-readable storage medium" shall also be taken to include any medium that is capable of storing or encoding a set of instructions for execution by the machine/computer and that cause the machine/computer to perform any one or more of the methodologies of the present invention. The terms "machine readable storage medium" or "computer-readable storage medium" shall accordingly be taken to include, but not be limited to, solid-state memories, and optical and magnetic media.

Various components described herein may be a means for performing the functions described herein. Each component described herein includes software, hardware, or a combination of these. The operations and functions described herein can be implemented as software modules, hardware modules, special-purpose hardware (e.g., application specific hardware, application specific integrated circuits (ASICs), digital signal processors (DSPs), etc.), embedded controllers, hardwired circuitry, etc.

Aside from what is described herein, various modifications may be made to the disclosed embodiments and implementations of the invention without departing from their scope. Therefore, the illustrations and examples herein should be construed in an illustrative, and not a restrictive sense.

What is claimed is:

1. A method, comprising:
    initiating, by a sandboxed preview process executing in a first sandbox within a data processing system, a sandboxed streaming preview process that executes in a second sandbox within the data processing system in response to a request for a preview of dynamic media content having a non-native content type, the sandboxed preview process comprising a designated plug-in for non-native content, wherein the request is received from a client application running within the data processing system, and wherein the request is originated from a user operating the data processing system to preview, via the client application, a file containing the dynamic media content stored in a storage device of the data processing system, the initiating including:
        determining a content type of the dynamic media content is the non-native content type;
        identifying a stream plug-in that is associated with the non-native content type;
        retrieving the stream plug-in by the designated plug-in; and
        launching the stream plug-in for execution within the sandboxed streaming preview process;
    converting, via the stream plug-in, the dynamic media content to a preview-specific format, including generating a stream of frames, the sandboxed streaming preview process representing a restricted operating environment having a set of resources exclusively allocated and utilized by the stream plug-in, wherein the sandboxed streaming preview process is separated from the client application, such that a failure of generating the stream of frames in a preview specific format within the sandboxed streaming preview process does not affect an operation of the client application;
    providing the stream of frames as the preview of the dynamic media content to the client application; and
    displaying, via the client application, the stream of frames on a display screen of the data processing system with limited user control functionality that is less than the user control functionality when the dynamic media content is displayed in a full view.

2. The method of claim 1, wherein the client application is part of a file management system provided by an operating system of the data processing system.

3. The method of claim 2, further comprising:
    providing the stream plug-in and the dynamic media content to the sandboxed streaming preview process.

4. The method of claim 1, wherein the generating further comprises:
    separately generating an audio component and a video component for each frame in the stream of frames.

5. The method of claim 1, wherein providing the stream of frames further comprises:
    providing the stream of frames for display on a frame-by-frame basis as each frame is generated; and
    providing one or more controls to facilitate user control of the dynamic media content during display of the preview.

6. The method of claim 1, wherein the stream plug-in is associated with an application and wherein the preview is viewable without launching the application.

7. A computer-readable storage medium having instructions stored thereon, that when executed, cause a computer to:
    initiate, by a sandboxed preview process executing in a first sandbox within the computer, a sandboxed streaming preview process that executes within a second sandbox within the computer in response to a request for a preview of dynamic media content having a non-native content type, the sandboxed preview process comprising a designated plug-in for non-native content, wherein the request is received from a client application running within the computer, and wherein the request is originated from a user operating the data processing system to preview, via the client application, a file containing the dynamic media content stored in a storage device of the data processing system, the initiating causing the computer to:
        determine a content type of the dynamic media content is the non-native content type;
        identify a stream plug-in that is associated with the non-native content type;
        retrieve the stream plug-in by the designated plug-in; and
        launch the stream plug-in for execution within the sandboxed streaming preview process;
    convert, via the stream plug-in, the dynamic media content to a preview-specific format, including generating a stream of frames, the sandboxed streaming preview process representing a restricted operating environment having a set of resources exclusively allocated and utilized by the stream plug-in, wherein the sandboxed streaming preview process is separated from the client application, such that a failure of generating the stream of frames in a preview specific format within the sandboxed streaming preview process does not affect an operation of the client application;
    provide the stream of frames as the preview of the dynamic media content to the client application; and
    display, via the client application, the stream of frames on a display screen of the data processing system with limited user control functionality that is less than the user control functionality when the dynamic media content is displayed in a full view.

8. The storage medium of claim 7, wherein the client application is part of a file management system provided by an operating system of the data processing system.

9. The storage medium of claim 8, comprising further instructions that cause the computer to:
    provide the stream plug-in and the dynamic media content to the sandboxed streaming preview process.

10. The storage medium of claim 7, wherein the instructions that cause the generating comprise further instructions that cause the computer to:
    separately generate an audio component and a video component for each frame in the stream of frames.

11. The storage medium of claim 7, wherein the instructions that cause the providing of the stream of frames comprise further instructions that cause the computer to:
    provide the stream of frames for display on a frame-by-frame basis as each frame is generated; and provide one or more controls to facilitate user control of the dynamic media content during display of the preview.

12. An apparatus, comprising:
processing means to
- initiate, by a sandboxed preview process executing in a first sandbox within the apparatus, a sandboxed streaming preview process within a second sandbox within the apparatus in response to a request for a preview of dynamic media content having a non-native content type, the sandboxed preview process comprising a designated plug-in for non-native content, wherein the request is received from a client application running within the apparatus, and wherein the request is originated from a user operating the data processing system to preview, via the client application, a file containing the dynamic media content stored in a storage device of the data processing system, the initiating causing the processing means to
- determine a content type of the dynamic media content is the non-native content type,
- identify a stream plug-in that is associated with the non-native content type,
- retrieve the stream plug-in by the designated plug-in; and
- launch the stream plug-in for execution within the sandboxed streaming preview process, generate a stream of frames in a preview specific format from the dynamic media content, the stream of frames generated via a stream plug-in that executes within the sandboxed streaming preview process, the sandboxed streaming preview process representing a restricted operating environment having a set of resources exclusively allocated and utilized by the plug-in, wherein the sandboxed streaming preview process is separated from the client application, and wherein a failure of generating the stream of frames in a preview specific format within the sandboxed streaming preview process does not affect an operation of the client application; and a display to display the generated stream of frames as the preview of the dynamic media content with limited user control functionality that is less than a full view of the dynamic media content.

13. The apparatus of claim 12, wherein the client application is part of a file management system provided by an operating system of the data processing system.

14. The apparatus of claim 12, the processing means further to:
separately generate an audio component and a video component for each frame in the stream of frames.

15. The apparatus of claim 12, the processing means further to:
provide the stream of frames to the display on a frame-by-frame basis as each frame is generated; and
provide one or more user interface controls to facilitate user control of the dynamic media content during display of the preview.

16. The apparatus of claim 12, wherein the stream plug-in is associated with an application and wherein the preview is viewable without launching the application.

* * * * *